United States Patent

Zielinski

[11] Patent Number: 6,038,744
[45] Date of Patent: Mar. 21, 2000

[54] HOSE CLAMP

[75] Inventor: Michael Zielinski, Gladstone, N.J.

[73] Assignee: Rotor Clamp, Inc., Somerset, N.J.

[21] Appl. No.: 09/255,770

[22] Filed: Feb. 23, 1999

[51] Int. Cl.⁷ .............................. B65D 63/00; F16L 33/02
[52] U.S. Cl. ..................... 24/20 R; 24/20 EE; 24/23 R
[58] Field of Search ................................. 24/20 R, 25 R, 24/20 EE, 23 R, 20 TT, 19; 285/253

[56] References Cited

U.S. PATENT DOCUMENTS

| | | |
|---|---|---|
| 973,532 | 10/1910 | McLaughlin . |
| 1,277,076 | 8/1918 | Ireland . |
| 1,379,476 | 5/1921 | Parr . |
| 1,615,144 | 1/1927 | Singley . |
| 2,472,172 | 6/1949 | Ovens et al. . |
| 2,629,908 | 3/1953 | Keck . |
| 3,602,953 | 9/1971 | Thomas . |
| 4,275,484 | 6/1981 | Irio et al. . |
| 4,319,385 | 3/1982 | Marchou . |
| 4,425,681 | 1/1984 | Ilius . |
| 4,425,682 | 1/1984 | Hashimoto et al. . |
| 4,517,708 | 5/1985 | Calmettes et al. . |
| 4,523,352 | 6/1985 | Wachter . |
| 4,583,268 | 4/1986 | Horcher born Kloss . |
| 4,674,720 | 6/1987 | Fetsch . |
| 4,713,863 | 12/1987 | Jennings ................................. 24/20 R |
| 4,750,242 | 6/1988 | Calmettes et al. . |
| 4,773,129 | 9/1988 | Muhr . |
| 4,858,279 | 8/1989 | Kato et al. . |
| 4,930,191 | 6/1990 | Takahashi et al. . |
| 4,930,192 | 6/1990 | Muhr . |
| 4,969,240 | 11/1990 | Sauer ....................................... 24/20 R |
| 4,996,749 | 3/1991 | Takahashi . |
| 5,185,907 | 2/1993 | Kawashima et al. . |
| 5,203,809 | 4/1993 | Oetiker . |
| 5,414,905 | 5/1995 | Kimura et al. . |
| 5,542,155 | 8/1996 | Kimura et al. . |
| 5,596,790 | 1/1997 | Möller ................................. 24/20 EE |
| 5,819,376 | 10/1998 | Kovalsky et al. ....................... 24/23 R |
| 5,855,044 | 1/1999 | Cradduck ............................... 24/20 R |

FOREIGN PATENT DOCUMENTS

| | | |
|---|---|---|
| 0713 993 A2 | 5/1996 | European Pat. Off. . |
| 3931783 | 4/1991 | Germany ............................... 24/20 R |

Primary Examiner—James R. Brittain
Assistant Examiner—Robert J. Sandy
Attorney, Agent, or Firm—Lerner, David, Littenberg, Krumholz & Mentlik, LLP

[57] ABSTRACT

A hose clamp is provided with a pair of radially outward bent terminal ends which are squeezable towards each other to expand the clamp. One of the terminal ends is provided with a projecting tongue which cooperates with the other terminal end to function as a stop member as well as an interlocking assembly. The interlocking assembly maintains the clamp in an expanded state while the stop member prevents the clamp from over expansion thereby maintaining its structural integrity.

23 Claims, 2 Drawing Sheets

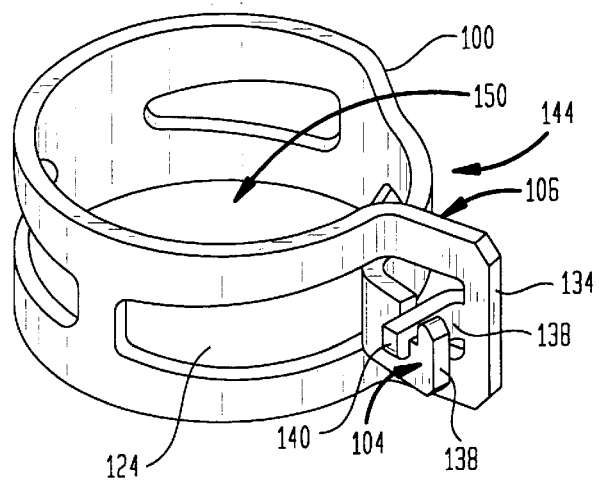
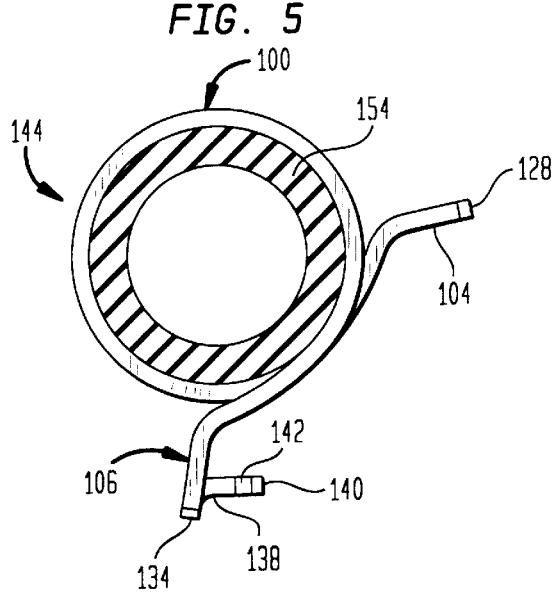
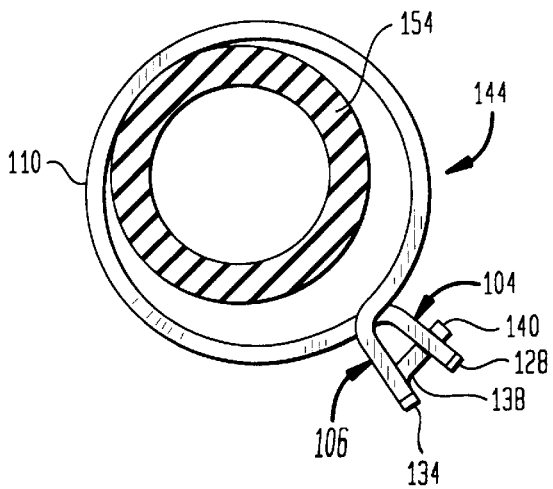

HOSE CLAMP

FIELD OF THE INVENTION

The present invention relates in general to hose clamps, and more specifically to self-compensating hose clamps constructed to be inherently capable of holding their expanded state without the use of a separate holding assembly.

BACKGROUND OF THE INVENTION

Various hoses are generally used in engine compartments of automotive vehicles for cooling the engine and supplying heat to the interior of the car. These hoses include those intended for use with low pressurized fluids which necessitate the use of a clamp to prevent disconnection and to maintain a fluid tight seal during use. A generally ring-shaped metal hose clamp is conventionally used so that the hose is reliably clamped by the inherent spring force designed into the construction of the clamp. It has been found desirable to provide the hose clamp at the site of assembly in a preexpanded state to facilitate its application and to increase the efficiency of the hose assembly connection process.

The aforementioned hose clamps were designed as an improvement over hose clamps of the type known from Hashimoto, et al., U.S. Pat. No. 4,425,682. When installing a hose clamp of the type disclosed in Hashimoto, et al., the hose clamp is first gripped and spread with a spreading tool into an expanded state while being positioned onto a fluid connection piece or the end of the hose. During the entire installation, the hose clamp must be kept spread open by means of the spreading tool. When the hose end has been pushed onto the connection piece, the expanded hose clamp is moved to its intended position by means of the spreading tool, and the spreading tool is detached from the hose clamp. The hose clamp springs back towards its original non-expanded state so as to compress about the hose thereby clamping the hose onto the connection piece in a fluid tight connection.

The use of a hose clamp pursuant to Hashimoto, et al., suffers from a number of disadvantages. For example, the use of such a hose clamp requires that one hand be used for manipulating the hose clamp with the spreading tool and the other hand for manipulating the hose end itself. This, plus the fact that the hose clamp can only be manipulated with a spreading tool and by applying considerable spreading force thereto, results in various installation problems and the possibility of improper connection which could result in fluid leaks and the like.

To this end there is known improvements to the aforementioned hose clamps which are operative for maintaining their expanded state without continuous manipulation of a spreading tool. Hose clamps of this type are known from, for example, Kimura, et al., U.S. Pat. No. 5,414,905; Oetiker, U.S. Pat. No. 5,203,809; Kawashima, et al., U.S. Pat. No. 5,185,907; Takahashi, U.S. Pat. No. 4,996,749; Muhr, U.S. Pat. No. 4,930,192; Takahashi, et al., U.S. Pat. No. 4,930,191; Kato, et al., U.S. Pat. No. 4,858,279; and Muhr, U.S. Pat. No. 4,773,129.

By way of example, Kimura, et al. discloses a self-locking hose clamp formed from a clamp body comprising a leaf spring arranged in the form of an annular band. The ends of the clamp body are bent relative to the main portion of the band to serve as grip strips. An engagement claw extends from one of the grip strips so as to be engageable with the other of the grip strips to hold the clamp body in a spread-diameter state in which the ends of the clamp body are close to each other. The engagement claw includes a claw portion projecting in an axially direction with respect to the annular band and a guide extending obliquely to the axial direction. The guide is operative for guiding the grip strips axially to guide the engagement claw into engagement with the opposing grip strip when the grip strips are brought towards each other in a circumferential direction to maintain the hose clamp in a spread-diameter state.

One of the deficiencies of the hose clamp pursuant to Kimura, et al. is the notable absence of a positive stop member. In this regard, as the grip strip engages the guide at the end of the engagement claw, this allows the grip strips to be brought closer together thereby further expanding the annular band. As a consequence, there is the possibility of over expanding the hose clamp thereby inducing adverse mechanical stresses which can affect the integrity of the hose clamp during use. This deficiency has been overcome by constructing a hose clamp having a stop member as known from European Patent Application EP 0713993.

The European application discloses a hose clamp formed from an annular band having a notch which enables the formation of a bent up tab to provide a stop member. Although the stop member is operative to prevent over expansion of the hose clamp, the construction by including a notch to form the tab results in a number of disadvantages. For example, the presence of the notch affects the integrity or mechanical strength of the annular band. Further, the formation of the tab requires an additional forming step of bending thereby adding additional tooling and manufacturing process operations. Still further, to the extent there is the desire to manufacture a hose clamp which does not include a self-locking feature, such as disclosed in the aforementioned Hashimoto, et al., the tooling requirements and change over time can adversely impact on the manufacturing efficiency and versatility.

The other aforementioned known hose clamps which provide a self-locking feature also suffer from disadvantages. For example, they may include complicated construction features which require advanced tooling resulting in further manufacturing costs, the use of separate removable locking elements and the like. In the case of a removable locking element, this construction is considered dangerous as the locking element often becomes a projectile when removed due to the spring force created by the hose clamp. Thus, it can be appreciated that there is still the need for further improvements in hose clamps which provide a self-locking feature while, at the same time, provide a mechanical stop member which prevents over expansion of the hose clamp to maintain its mechanical integrity.

SUMMARY OF THE INVENTION

An object of the present invention is to provide a hose clamp which includes a self-locking feature and a stop member to prevent over expansion.

Another object of the present invention is to provide a hose clamp which is of simple construction.

Another object of the present invention is to provide a hose clamp which preserves the integrity of the annular band so as to maintain its mechanical strength.

In accordance with one embodiment of the present invention there is described a hose clamp comprising a clamp body having a longitudinal axis formed into an annular configuration having a main section and first and second terminal ends formed outwardly relative to the main section, the first terminal end formed between a pair of spaced apart side edges having a first notch opening along one side edge thereof, a tongue at the second terminal end projecting in a direction toward the first terminal end formed between a pair of spaced apart side edges having a second notch opening along one side thereof in an opposite direction to the first notch, the tongue having a free end formed as a stop member such that when the first and second terminal ends are brought towards each other in a direction along the longitudinal axis the stop member is engageable with a portion of the first terminal end adjacent the first notch to prevent further expansion of the clamp body, the first and second notches being engageable with each other to releasably hold the clamp body in an expanded state upon displacement of the stop member past the first terminal end and being disengageable with each other to release the clamp body from the expanded state upon lateral displacement of the tongue relative to the first terminal end.

In accordance with another embodiment of the present invention there is described a hose clamp comprising a clamp body having a longitudinal axis formed into an annular configuration having a main section and first and second terminal ends, the first and second terminal ends being bent outwardly relative to the main section, the first terminal end formed between a pair of spaced apart side edges having a U-shaped first notch opening along one side edge thereof, a tongue at the second terminal end being bent relative thereto in a direction toward the first terminal end, the tongue formed between a pair of spaced apart side edges having a U-shaped second notch opening along one side thereof in an opposite direction to the first notch, the first and second notches arranged on opposite sides of the longitudinal axis, the tongue having a free end formed as an expansion stop member having a face arranged transverse to the longitudinal axis such that when the first and second terminal ends are brought towards each other in a direction along the longitudinal axis for expanding the clamp body the face of the stop member is engageable with a portion of the first terminal end adjacent the first notch to prevent further expansion of the clamp body, the first and second notches being engageable with each other to releasably hold the clamp body in an expanded state upon twisting the stop member past the first terminal end and being disengageable with each other to release the clamp body from the expanded state upon lateral twisting of the tongue relative to the first terminal end.

BRIEF DESCRIPTION OF THE DRAWINGS

The above description, as well as further objects, features and advantages of the present invention will be more fully understood with reference to the following detailed description of a hose clamp, when taken in conjunction with the accompanying drawings, wherein:

FIG. 4 is a perspective view of the hose clamp in a self-locking expanded state wherein the annular band has been expanded from its contracted state as shown in FIG. 3;

FIG. 5 is a top plan view of the hose clamp compressed about a hose to form a fluid tight seal with a connection piece to which the hose is attached; and FIG. 6 is a top plan view of the hose clamp in a self-locking expanded state adhered to a hose for clamping thereto.

DETAILED DESCRIPTION OF THE PREFERRED EMBODIMENTS

In describing the preferred embodiments of the subject matter illustrated and to be described with respect to the drawings, specific terminology will be resorted to for the sake of clarity. However, the invention is not intended to be limited to the specific terms so selected, and is to be understood that each specific term includes all technical equivalence which operate in a similar manner to accomplish a similar purpose.

Figure 1:
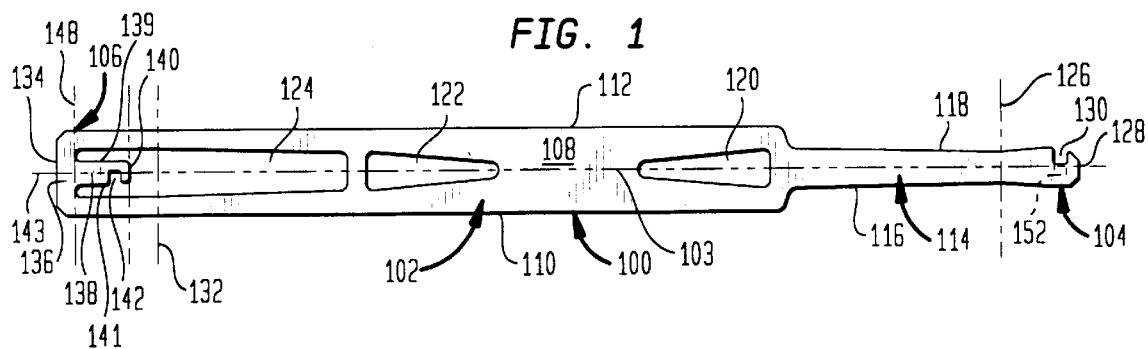
FIG. 1 is a top plan view of a band stamped to provide the features of a hose clamp constructed in accordance with the present invention prior to forming into an annular configuration.

Referring now to the drawings, wherein like reference symbols represent like elements, there is shown in FIG. 1 an elongated band 100 which has been configured to form a hose clamp in accordance with one embodiment of the present invention. The band 100 is generally stamped using progressive tooling from a sheet of metal having a uniform thickness. The band 100 is formed from materials such as spring steel which provides inherent spring-like properties. By way of example, the band 100 can be formed from carbon steel, 6150 chrome-vanadium alloy and the like. It is therefore to be understood that other metals and metal alloys which possess spring-like properties may be used in the construction of the hose clamp in accordance with the present invention.

The band 100 is formed to include a main section 102 having a longitudinal axis 103, a first terminal end 104 and a second terminal end 106. The main section 102 includes a straight portion 108 formed between a pair of parallel spaced apart side edges 110, 112 and a tapered portion 114 formed between a pair of spaced apart tapered side edges 116, 118. The tapered portion 114 is formed without any openings, while the straight portion 108 is formed with a plurality of openings 120, 122, 124 which may have a variety of shapes. For example, openings 120, 122 are illustrated as having a triangular shape, while opening 124 has a narrow elongated rectangular or slightly trapezoidal shape. The openings 120, 122, 124 provide a uniform clamping force over the entire circumference of a hose when it is clamped by means of the hose clamp. In addition, opening 124 is sized and shaped as a guide to permit movement of the tapered portion 114 of the band 100 as the band is regularly expanded and contracted when formed into an annular band. In this regard, it is to be understood that the size, shape and locations of the openings 120, 122, 124 are based upon principals well known in the art of hose clamp design, the details of which are therefore known to those skilled in the art.

The first terminal end 104 of the band 100 is generally defined between the location identified by dashed line 126 and a terminal edge 128 which is in the nature of a flat face, as well as between the side edges 116, 118. It will be understood from a description of the operation of the hose clamp that the terminal edge 128 may be other than a flat face if so desired. A first notch 130 is formed in the terminal end 104 adjacent terminal edge 128 having its opening along side edge 118. The notch 130, in accordance with one embodiment, is illustrated as being generally rectangular or U-shaped. It is to be understood that other shapes of the notch 130 may be formed in the terminal end 104 as will be readily apparent from a further description as to the function of the notch 130. Briefly, the notch 130 will function in a cooperative manner so as to maintain the hose clamp in a releasably self-locked expanded state.

Figure 2:
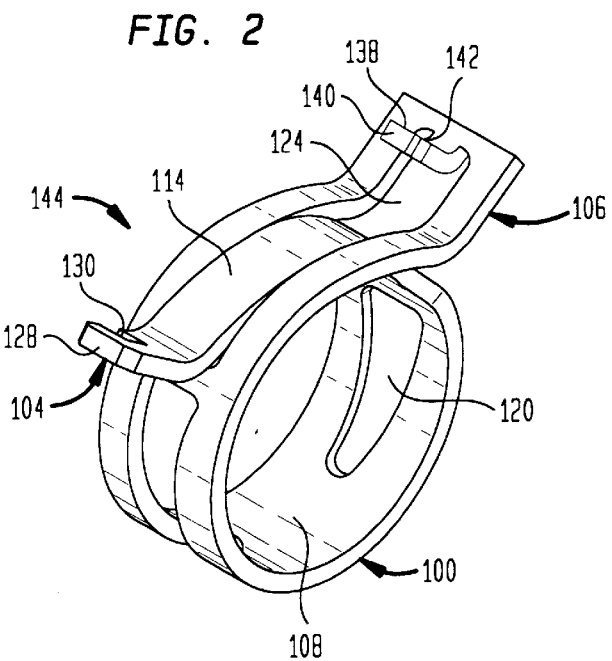
FIG. 2 is a perspective view of a hose clamp constructed from the band shown in FIG. 1 after forming into an annular configuration for use in a variety of hose clamping applications.

The second terminal end 106 is formed from the main section 102 of band 100 from a location generally beginning at dashed line 132 extending to a terminal edge 134. It is noted that the width of the second terminal end 106 is wider than the width of the first terminal end 104. This construction allows the tapered portion 114 to be received within opening 124 when the band 100 is formed into an annular configuration as shown in FIG. 2.

The terminal edge 134 of the second terminal end 106 is defined by an end member 136 from which there extends into the opening 124 a tongue 138. The tongue 138 is defined between spaced apart side edges 139, 141 having a longitudinal axis 143. As shown, the longitudinal axis 143 of the tongue 138 is arranged in general alignment with the longitudinal axis 103 of the band 100. The tongue 138 is provided with a terminal edge 140 which is generally defined by a flat face arranged transverse to the longitudinal axes 103, 143 of the band 100 and tongue. By virtue of this construction, the terminal edge 140 will function as a stop member as to be described hereinafter.

A second notch 142 is formed in the tongue 138 adjacent the terminal edge 140 opening in a direction toward side edge 141 of the tongue or side edge 110 of the band 100. It is therefore to be noted that the first and second notches 130, 142 open in opposite directions, that is, towards opposing side edges 112, 110, respectively, of the band 100. The second notch 142 may be formed as a rectangular or U-shaped notch, as well as other shapes as noted with respect to the first notch 130. Preferably, the first and second notches 130, 142 will have the same shape, for example, rectangular or U-shaped.

Figure 3:
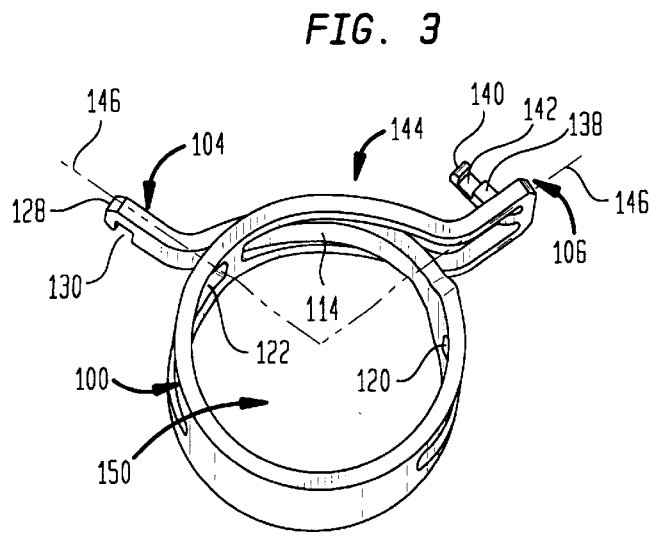
FIG. 3 is a top plan view of the hose clamp in its annular configuration as shown at FIG. 2.

The band 100 and the features as thus far described may be formed using progressive tooling in an automated stamping apparatus from suitable metal sheet stock. The resulting band 100 will have the configuration as thus far described with respect to FIG. 1. The band 100 is configured into an annular configuration to form a hose clamp 144 as shown in FIGS. 2 and 3. During the forming process, the band 100 is formed into its circular shape with the tapered portion 114 extending through opening 124. The first terminal end 104 is bent radially outward about dashed line 126, while the second terminal end 106 is bent radially outward about dashed line 132. As best shown in FIG. 3, the first and second terminal ends 104, 106 are generally arranged along a radius 146 of the clamp 144, although other orientations are contemplated, such as at an angle on either side of the radius 146. As shown, the first and second terminal ends 140, 146 are arranged in spaced apart opposing relationship extending outwardly from the band 100.

Tongue 138 is bent upwardly about dashed line 148, see FIG. 1, in a direction extending toward the first terminal end 104. The tongue 138 is arranged at an angle of approximately 90° to the second terminal end 106, although other angles of a greater or less degree are also contemplated. The hose clamp 144 forms a circular opening 150 formed by the band 100. The opening 150, depending upon the overall length of the band 100, can be formed into a variety of sizes so as to accommodate hoses of an equal variety of sizes. Generally, the size of the opening 150 will be less than the outside diameter of the hose to be clamped.

There will now be described the use of the hose clamp 144 in accordance with one embodiment of the present invention. As thus far described, the hose clamp 144 is constructed to be releasably self-locking in an expanded state wherein the size of the opening 150 is increased from its manufactured state. With reference to FIGS. 4 through 6, a tool (not shown) such as a pair of pliers is used for engaging the first and second terminal ends 104, 106. By means of the tool, the first and second terminal ends 104, 106 are squeezed together along longitudinal axis 103 thereby expanding the size of the opening 150. Overexpansion of the hose clamp 144 is prevented by the terminal edge 140 of the tongue 138 acting as a stop member. In this regard, the terminal edge 140 of the tongue 138 is arranged in alignment with a solid portion 152 (see FIG. 1) of the first terminal end 104 adjacent the first notch 130. The engagement of the terminal edge 140 with the solid portion 152 will prevent inadvertent further expansion of the hose clamp 144 beyond its intended design limits which might otherwise affect the mechanical integrity of the clamp during use. It should be appreciated that the tongue 138 by virtue of its stop function will prevent an operator from expanding the clamp 144 whereby the first and second terminal ends 104, 106 engage one another in a condition which over expands the band 100 and potentially causes mechanical failure.

During the expansion of the band 100, the first and second terminal ends 104, 106 are laterally displaced slightly from each other such as by twisting. This lateral displacement allows the terminal edge 140 of the tongue 138 to bypass the solid portion 152 so that the first and second notches 130, 142 can be engaged with each other thereby locking the hose clamp 144 in an expanded state as shown in FIG. 4. The slight additional expansion of the band 100 to affect interlocking of tongue 138 with the first terminal end 104 will not affect the mechanical integrity of the band 100.

In its expanded state, the hose clamp 144 may be slipped over a hose 154 such as shown in FIG. 5. The hose is subsequently forced over an appropriate connection piece (not shown) to which fluid connection is desired. A fluid tight connection is obtained by releasing the clamp 144 so that it returns towards its initial unexpanded condition thereby providing a uniform compressive force circumferentially about the hose 154 by means of the band 100. This is accomplished using a suitable tool (not shown) such as a screw driver or the like to once again laterally displace such as by twisting the first and second terminal ends 104, 106 thereby disengaging the first and second notches 130, 142 which are respectively formed in the first terminal end 104 and tongue 138. The hose 154 under compression of the hose clamp 144 is illustrated in FIG. 5. If desired, the hose clamp 144 may be removed for replacement of the hose 154 by reversing the process of squeezing the first and second terminal ends 104, 106 towards each other using any suitable tool such as a pair of pliers and the like.

In accordance with another embodiment, it is known in the industry to glue or otherwise adhere a hose clamp 144 in its locked expanded state onto a hose 154 such as shown in FIG. 6. It is known to perform this operation at the site of the hose manufacturer such that a hose and clamp assembly is shipped to the end user in the condition as shown. At the site of installation, an operator will force the hose of the hose clamp assembly over the connection piece to which fluid connection is desired. Once installed, the operator using a suitable tool will release the hose clamp 144 from its locked expanded state to return to its state as shown in FIG. 5 thereby applying a fluid tight compressive force to the hose 154. The hose clamp 144 may be removed for replacement of the hose 154 in a manner as previously described.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed:

1. A hose clamp comprising a clamp body having a longitudinal axis formed into an annular configuration having a main section and first and second terminal ends formed outwardly relative to said main section, said first terminal end formed between a pair of spaced apart side edges having a first notch opening along one of said side edges thereof, a tongue at said second terminal end projecting in a direction toward said first terminal end formed between a pair of spaced apart side edges having a second notch opening along one side thereof in an opposite direction to said first notch, said tongue having a free end facing said first terminal end and formed as a stop member having a flat face extending between said side edges and arranged transverse to said longitudinal axis of said clamp body, whereby when said first and second terminal ends are brought towards each other in a direction along said longitudinal axis said face of said stop member is engageable with a portion of said first terminal end adjacent said first notch to prevent further expansion of said clamp body, said first and second notches being engageable with each other to releasably hold said clamp body in an expanded state upon displacement of said stop member past said first terminal end and being disengageable with each other to release said clamp body from said expanded state upon lateral displacement of said tongue relative to said first terminal end.

2. The clamp of claim 1, wherein said first and second terminal ends are bent radially outward.

3. The clamp of claim 2, wherein said first and second ends are bent at an angle of about 90° to said main section.

4. The clamp of claim 1, wherein said first terminal end has a width narrower than the width of said second terminal end.

5. The clamp of claim 1, wherein said tongue is bent at an angle of about 90° to said second terminal end.

6. The clamp of claim 1, wherein said first and second notches have a general U-shape.

7. A method of clamping a hose comprising providing a hose clamp in accordance with claim 1, expanding said clamp body by bringing said first and second terminal ends towards each other, laterally displacing said first terminal end and said flat face of said stop member relative to each other, engaging said first notch with said second notch for maintaining said clamp body in an expanded state, positioning said clamp body over a hose to be clamped, and disengaging said tongue from said first terminal end whereby said clamp body contracts about said hose.

8. The method of claim 7, wherein said first terminal end and said tongue are disengaged by lateral twisting of said tongue with respect to said first terminal end.

9. The method of claim 7, wherein said flat face is abutted against a portion of said first terminal end.

10. The clamp of claim 1, wherein said first and second notches are arranged on opposite sides of said longitudinal axis of said clamp body.

11. The clamp of claim 10, wherein said notches have a general U-shape.

12. The clamp of claim 1, wherein said tongue has a longitudinal axis in alignment with said longitudinal axis of said clamp body.

13. The clamp of claim 1, wherein said second notch formed in said tongue is spaced from said second terminal end.

14. The clamp of claim 1, wherein said tongue has a width narrower than the width of first terminal end.

15. A hose clamp comprising a clamp body having a longitudinal axis formed into an annular configuration having a main section and first and second terminal ends, said first and second terminal ends being bent outwardly relative to said main section, said first terminal end formed between a pair of spaced apart side edges having a U-shaped first notch opening along one of said side edges thereof, a tongue at said second terminal end being bent relative thereto in a direction toward said first terminal end, said tongue formed between a pair of spaced apart side edges having a U-shaped second notch opening along one side thereof in an opposite direction to said first notch, said first and second notches arranged on opposite sides of said longitudinal axis, said tongue having a free end facing said first terminal end formed as an expansion stop member having a flat face extending between said side edges and arranged transverse to said longitudinal axis, whereby when said first and second terminal ends are brought towards each other in a direction along said longitudinal axis for expanding said clamp body said face of said stop member is engageable with a portion of said first terminal end adjacent said first notch to prevent further expansion of said clamp body, said first and second notches being engageable with each other to releasably hold said clamp body in an expanded state upon twisting said stop member past said first terminal end and being disengageable with each other to release said clamp body from said expanded state upon lateral twisting of said tongue relative to said first terminal end.

16. The clamp of claim 15, wherein said tongue has a width narrower than the width of said first terminal end.

17. The clamp of claim 15, wherein said first and second ends are bent at an angle of about 90° to said main section.

18. The clamp of claim 17, wherein said tongue is bent at an angle of about 90° to said second terminal end.

19. The clamp of claim 15, wherein said tongue has a longitudinal axis in alignment with said longitudinal axis of said clamp body.

20. The clamp of claim 15, wherein said first terminal end has a width narrower than the width of said second terminal end.

21. A method of clamping a hose comprising providing a hose clamp in accordance with claim 15, expanding said clamp body by squeezing said first and second terminal ends towards each other, laterally displacing said first terminal end relative to said flat face of said stop member, engaging said first notch with said second notch for maintaining said clamp body in an expanded state, positioning said clamp body over a hose to be clamped, and disengaging said tongue from said first terminal end whereby said clamp body contracts about said hose.

22. The method of claim 21, wherein said flat face is abutted against a portion of said first terminal end.

23. The method of claim 21, wherein said first terminal end and said tongue are disengaged by lateral twisting of said tongue with respect to said first terminal end.

* * * * *